(12) United States Patent
Yuan et al.

(10) Patent No.: US 10,564,697 B2
(45) Date of Patent: Feb. 18, 2020

(54) OTG PERIPHERAL, POWER SUPPLY METHOD, TERMINAL AND SYSTEM

(71) Applicant: HUAWEI TECHNOLOGIES CO., LTD., Shenzhen (CN)

(72) Inventors: Jiangfeng Yuan, Beijing (CN); Zhi Chang, Beijing (CN); Gang Cui, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 15/576,699

(22) PCT Filed: May 25, 2015

(86) PCT No.: PCT/CN2015/079735
§ 371 (c)(1),
(2) Date: Nov. 22, 2017

(87) PCT Pub. No.: WO2016/187790
PCT Pub. Date: Dec. 1, 2016

(65) Prior Publication Data
US 2018/0164869 A1   Jun. 14, 2018

(51) Int. Cl.
*G06F 1/3234*   (2019.01)
*G06F 1/26*   (2006.01)
(Continued)

(52) U.S. Cl.
CPC ............ *G06F 1/3253* (2013.01); *G06F 1/263* (2013.01); *G06F 1/266* (2013.01);
(Continued)

(58) Field of Classification Search
CPC . G06F 1/26; G06F 1/263; G06F 1/266; G06F 1/28; G06F 1/3253; G06F 13/14;
(Continued)

(56) References Cited

U.S. PATENT DOCUMENTS 8,738,952 B1   5/2014   Lachwani et al.
2003/0054703 A1   3/2003   Fischer et al.
(Continued)

FOREIGN PATENT DOCUMENTS

CN   101359316 A   2/2009
CN   202856125 U   4/2013
(Continued)

*Primary Examiner* — Thomas J. Cleary
(74) *Attorney, Agent, or Firm* — Kilpatrick Townsend & Stockton LLP

(57) ABSTRACT

In a power supply system, when a power supply is inserted into a power interface of the OTG peripheral, the power supply supplies power to a USB secondary device connected to a second USB interface of the OTG peripheral; and when the power supply is inserted into the power interface of the OTG peripheral, the OTG peripheral outputs a high-level pulse by using the first USB interface of the OTG peripheral, so as to trigger a terminal connected to the first USB interface to stop supplying power to the USB secondary device; and in addition, the OTG peripheral enables, after a delay of a preset safe time, the power supply to supply power to the terminal connected to the first USB interface.

18 Claims, 7 Drawing Sheets

(51) Int. Cl.
*G06F 13/42* (2006.01)
*H02J 7/00* (2006.01)

(52) U.S. Cl.
CPC .. *G06F 13/4282* (2013.01); *G06F 2213/0042* (2013.01); *H02J 7/00* (2013.01); *H02J 2007/0062* (2013.01)

(58) Field of Classification Search
CPC ............ G06F 13/4027; G06F 13/4022; G06F 13/4063; G06F 13/4068; G06F 13/4282; G06F 2213/0042; H02J 7/00; H02J 2007/0001; H02J 2007/0062
See application file for complete search history.

(56) References Cited

U.S. PATENT DOCUMENTS

| | | | | |
|---|---|---|---|---|
| 2005/0033996 | A1* | 2/2005 | Fong | G06F 1/266 713/300 |
| 2006/0065743 | A1 | 3/2006 | Fruhauf | |
| 2006/0145666 | A1* | 7/2006 | Liu | H02J 7/0055 320/138 |
| 2007/0055805 | A1* | 3/2007 | Hayashi | G06F 1/26 710/306 |
| 2010/0169534 | A1* | 7/2010 | Saarinen | G06F 1/266 710/316 |
| 2010/0244587 | A1* | 9/2010 | Tiovola | G06F 13/4081 307/130 |
| 2011/0273144 | A1* | 11/2011 | Yu | H02J 7/0052 320/162 |
| 2013/0013936 | A1* | 1/2013 | Lin | G06F 1/266 713/300 |
| 2014/0310545 | A1 | 10/2014 | Xu et al. | |
| 2015/0363344 | A1* | 12/2015 | Bobbitt | G06F 13/4022 710/316 |
| 2016/0190847 | A1* | 6/2016 | Han | H02J 1/10 320/134 |
| 2016/0216750 | A1* | 7/2016 | Hundal | G06F 1/266 |
| 2016/0359322 | A1* | 12/2016 | Kim | H02J 1/00 |

FOREIGN PATENT DOCUMENTS

| | | |
|---|---|---|
| CN | 103457458 A | 12/2013 |
| CN | 203387203 U | 1/2014 |
| EP | 2662947 A2 | 11/2013 |
| EP | 2746959 A1 | 6/2014 |
| JP | 5483479 B2 | 5/2014 |

* cited by examiner

OTG PERIPHERAL, POWER SUPPLY METHOD, TERMINAL AND SYSTEM

CROSS REFERENCE TO RELATED APPLICATIONS

This application is a national stage of International Application No. PCT/CN2015/079735, filed on May 25, 2015, which is hereby incorporated by reference in its entirety.

TECHNICAL FIELD

The present disclosure relates to the field of power supply technologies, and in particular, to an OTG peripheral, a power supply method, a terminal, and a system.

BACKGROUND

An existing terminal supports a Universal Serial Bus, On-The-Go (USB OTG) function. The OTG is a supplementary standard of an USB specification, and can enable a USB device, such as a mobile phone, to be a USB primary device (host). An intelligent terminal acting as the USB primary device can connect to, access, and communicate with a USB peripheral such as a removable hard disk having a USB interface, an input device, and a card reader.

However, during OTG communication, the intelligent terminal supplies power to the USB peripheral, such as the removable hard disk, the input device, and the card reader, that is connected to the intelligent terminal, causing excessively quick power consumption of the intelligent terminal. In this case, the USB peripheral needs to be removed to charge the intelligent terminal, which causes interruption of the OTG communication between the intelligent terminal and the USB peripheral.

SUMMARY

Embodiments of the present disclosure provide an OTG peripheral, a power supply method, a terminal, and a system, to supply, during OTG communication, power to a primary device connected to the OTG peripheral and a secondary device connected to the OTG peripheral at the same time.

According to a first aspect, an OTG peripheral is provided, including: a delay conduction circuit, a detection circuit, a first USB interface, a power interface, and a second USB interface, where the first USB interface is connected to the second USB interface, and an ID pin of the first USB interface is connected to a low level;

the power interface is connected to a power pin of the first USB interface by using the delay conduction circuit and is configured to: after the power interface is powered on, delay power supplied to the first USB interface;

the detection circuit is separately connected to the ID pin of the first USB interface and the power interface, and the detection circuit is configured to: when it is detected that the power interface is powered on, output a high-level pulse to the ID pin of the first USB interface, so as to trigger a terminal connected to the first USB interface to stop supplying power to the second USB interface; and the power interface is connected to a power pin of the second USB interface and is configured to supply power to the second USB interface after the power interface is powered on.

With reference to the first aspect, in a first possible implementation manner, the detection circuit is further configured to: when it is detected that the power interface is powered off, output a high-level pulse to the ID pin of the first USB interface, so as to trigger the terminal connected to the first USB interface to supply power to the second USB interface.

With reference to the first aspect, or with reference to the first possible implementation manner of the first aspect, in a second possible implementation manner, the peripheral further includes: an electric power storage circuit, where the electric power storage circuit is connected to the power interface and is connected to the power pin of the second USB interface, and is configured to: after the power interface is powered on, store power supplied from the power interface, and supply power to the second USB interface after the power interface is powered off.

With reference to the first aspect, or with reference to the first possible implementation manner of the first aspect, in a third possible implementation manner, a power end of the detection circuit is connected to the power pin of the second USB interface, and is configured to receive power supplied from the power interface or the first USB interface.

With reference to the second possible implementation manner of the first aspect, in a fourth possible implementation manner, a power end of the detection circuit is connected to the power pin of the second USB interface, and is configured to receive power supplied from the power interface, the first USB interface, or the electric power storage circuit.

With reference to the first aspect, or with reference to any implementation manner of the first to the fourth possible implementation manners of the first aspect, in a fifth possible implementation manner, the delay conduction circuit includes: a switch circuit and a delay circuit, where the delay circuit controls a conduction time of the switch circuit; and when the switch circuit is on, a circuit between the power interface and the power pin of the first USB interface is a closed circuit; or when the switch circuit is cut off, a circuit between the power interface and the power pin of the first USB interface is an open circuit.

With reference to the first aspect, or with reference to any implementation manner of the first to the fifth possible implementation manners of the first aspect, in a sixth possible implementation manner, the detection circuit includes: a double monostable trigger circuit, where a negative-going transition triggered input end of a first monostable trigger circuit of the double monostable trigger circuit is connected to the power interface, and a positive-going transition triggered input end of the first monostable trigger circuit is connected to a low level;

a negative-going transition triggered input end of a second monostable trigger circuit of the double monostable trigger circuit is connected to the power pin of the second USB interface; and a positive-going transition triggered input end of the second monostable trigger circuit of the double monostable trigger circuit is connected to the power interface;

an output end of the first monostable trigger circuit and an output end of the second monostable trigger circuit output a signal through an OR gate circuit, and an output end of the OR gate circuit is connected to the ID pin of the first USB interface; and the double monostable trigger circuit is configured to output high-level pulse signals through the OR gate circuit at both a positive-going transition and a negative-going transition of a signal of the power interface.

With reference to the fifth possible implementation manner of the first aspect, in a seventh possible implementation manner, the delay conduction circuit further includes a second resistor; the switch circuit is a P-MOS transistor switch circuit; and the delay circuit includes: a first capacitor and a first resistor that are connected in series, where the first capacitor is connected in parallel between a gate and a source of the MOS transistor, the gate of the MOS transistor is grounded by using the first resistor, the source of the MOS transistor is connected to the power interface, and a drain of the MOS transistor is connected to the power pin of the first USB interface; and the second resistor is also connected in parallel between the gate and the source of the MOS transistor, and the second resistor is configured to adjust a voltage between the gate and the source of the MOS transistor.

With reference to the seventh possible implementation manner of the first aspect, in an eighth possible implementation manner, the delay conduction circuit further includes a second capacitor, where the second capacitor is also connected in parallel between the gate and the source of the P-MOS transistor; and a capacitance of the second capacitor is less than that of the first capacitor, and the second capacitor is configured to: when the power interface is powered on, increase a gate voltage of the P-MOS transistor to a supply voltage of the power interface, so that the P-MOS transistor is in a cut-off state.

With reference to the fifth possible implementation manner of the first aspect, in a ninth possible implementation manner, the delay conduction circuit further includes: a boost circuit and a fourth resistor; the switch circuit is an N-MOS transistor switch circuit; and the delay circuit includes: a third resistor and a third capacitor that are connected in series; a source of the N-MOS transistor is connected to the power pin of the first USB interface, a drain of the N-MOS transistor is connected to the power interface, and a gate of the N-MOS transistor is grounded by using the third capacitor; a power input end of the boost circuit is connected to the power interface, and a power output end of the boost circuit is connected to the gate of the N-MOS transistor by using the third resistor and is configured to increase a gate voltage of the N-MOS transistor; and the fourth resistor is connected in parallel to the third capacitor and is configured to adjust the gate voltage of the N-MOS transistor.

With reference to the second possible implementation manner of the first aspect, or with reference to the fourth possible implementation manner of the first aspect, in a tenth possible implementation manner, the electric power storage circuit includes: a fifth resistor and a fourth capacitor that are connected in series, where the fifth resistor is connected to the power pin of the second USB interface, and the fourth capacitor is grounded.

With reference to the first aspect, or with reference to any implementation manner of the first to the tenth possible implementation manners of the first aspect, in an eleventh possible implementation manner, the peripheral further includes: a first unilateral conduction component, where the first unilateral conduction component is connected in series between the delay conduction circuit and the power pin of the first USB interface, and the first unilateral conduction component is configured to cut off a backflow current that flows from the first USB interface to the power interface through the conductive delay conduction circuit.

With reference to the first aspect, or with reference to any implementation manner of the first to the eleventh possible implementation manners of the first aspect, in a twelfth possible implementation manner, the peripheral further includes:

a second unilateral conduction component, where the second unilateral conduction component is connected in series between the detection circuit and the ID pin of the first USB interface, and the second unilateral conduction component is configured to cut off the high-level pulse output by the detection circuit from flowing to the first USB interface.

With reference to the first aspect, or with reference to the first possible implementation manner of the first aspect, or with reference to the third possible implementation manner of the first aspect, or with reference to any implementation manner of the fifth to ninth possible implementation manners of the first aspect, or with reference to any implementation manner of the eleventh to twelfth possible implementation manners of the first aspect, in a thirteenth possible implementation manner, the peripheral further includes: a third unilateral conduction component, where the third unilateral conduction component is connected in series between the power pin of the second USB interface and the power interface, and the third unilateral conduction component is configured to cut off a backflow current that flows from the first USB interface to the power interface.

With reference to the second possible implementation manner of the first aspect, or with reference to the fourth possible implementation manner of the first aspect, or with reference to the tenth possible implementation manner of the first aspect, in a fourteenth possible implementation manner, the peripheral further includes: a third unilateral conduction component, where the third unilateral conduction component is connected in series between the power pin of the second USB interface and the power interface, and the third unilateral conduction component is configured to cut off a backflow current that flows from the electric power storage circuit and/or the first USB interface to the power interface.

With reference to the first aspect, or with reference to the first possible implementation manner of the first aspect, or with reference to the third possible implementation manner of the first aspect, or with reference to any implementation manner of the fifth to ninth possible implementation manners of the first aspect, or with reference to any implementation manner of the eleventh to thirteenth possible implementation manners of the first aspect, in a fifteenth possible implementation manner, the peripheral further includes: a fourth unilateral conduction component, where the fourth unilateral conduction component is connected in series between the power pin of the first USB interface and the power pin of the second USB interface, and the fourth unilateral conduction component is configured to cut off a current that flows from the power interface to the first USB interface.

With reference to the second possible implementation manner of the first aspect, or with reference to the fourth possible implementation manner of the first aspect, or with reference to the tenth possible implementation manner of the first aspect, or with reference to the fourteenth possible implementation manner, in a sixteenth possible implementation manner, the peripheral further includes: a fourth unilateral conduction component, where the fourth unilateral conduction component is connected in series between the power pin of the first USB interface and the power pin of the second USB interface, and the fourth unilateral conduction component is configured to cut off a current that flows from the electric power storage circuit and/or the power interface to the first USB interface.

According to a second aspect, a power supply method is provided, including:

identifying, by a terminal, that an OTG peripheral is inserted into a preset USB interface, where the OTG peripheral includes: a delay conduction circuit, a detection circuit, a first USB interface, a power interface, and a second USB interface, where the first USB interface is connected to the second USB interface, and an ID pin of the first USB interface is connected to a low level; the power interface is connected to a power pin of the first USB interface by using the delay conduction circuit and is configured to: after the power interface is powered on, delay power supplied to the first USB interface; the detection circuit is separately connected to the ID pin of the first USB interface and the power interface, and the detection circuit is configured to: when it is detected that the power interface is powered on or powered off, output a high-level pulse to the ID pin of the first USB interface; and the power interface is connected to a power pin of the second USB interface and is configured to supply power to the second USB interface after the power interface is powered on; and when the terminal detects a high-level pulse at an ID pin of the preset USB interface, determining, by the terminal in response to the high-level pulse, whether the terminal is in a state of supplying power to the second USB interface; and if yes, stopping supplying power to the second USB interface and receiving, by using the preset USB interface, power supplied from the power interface; or if not, supplying power to the second USB interface.

With reference to the second aspect, in a first possible implementation manner, the identifying, by a terminal, that an OTG peripheral is inserted into a preset USB interface further includes:

if the terminal detects that a power pin of the preset USB interface has electricity, performing the step of stopping supplying power to the second USB interface and receiving, by using the preset USB interface, power supplied from the power interface.

According to a third aspect, a terminal is provided, including:

an identification module, configured to identify that an OTG peripheral is inserted into a preset USB interface, where the OTG peripheral includes: a delay conduction circuit, a detection circuit, a first USB interface, a power interface, and a second USB interface, where the first USB interface is connected to the second USB interface, and an ID pin of the first USB interface is connected to a low level; the power interface is connected to a power pin of the first USB interface by using the delay conduction circuit and is configured to: after the power interface is powered on, delay power supplied to the first USB interface; the detection circuit is separately connected to the ID pin of the first USB interface and the power interface, and the detection circuit is configured to: when it is detected that the power interface is powered on or powered off, output a high-level pulse to the ID pin of the first USB interface; and the power interface is connected to a power pin of the second USB interface and is configured to supply power to the second USB interface after the power interface is powered on;

a determining module, configured to: when the terminal detects a high-level pulse at an ID pin of the preset USB interface, determine in response to the high-level pulse, whether the terminal is in a state of supplying power to the second USB interface;

a first management module, configured to: when a determining result output by the determining module is yes, stop supplying power to the second USB interface and receive, by using the preset USB interface, power supplied from the power interface; and a second management module, configured to: when the determining result output by the determining module is not, supply power to the second USB interface.

With reference to the third aspect, in a first possible implementation manner, the terminal further includes: a third management module, configured to: when the identification module identifies that the OTG peripheral is inserted into the preset USB interface on the terminal, if the terminal detects that a power pin of the preset USB interface has electricity, perform the step of stopping supplying power to the second USB interface and receiving, by using the preset USB interface, power supplied from the power interface.

According to a fourth aspect, a terminal is provided, including:

an input apparatus, an output apparatus, a memory, and a processor coupled to the memory, where the processor reads an instruction stored in the memory to perform the following steps:

identifying that an OTG peripheral is inserted into a preset USB interface, where the OTG peripheral includes: a delay conduction circuit, a detection circuit, a first USB interface, a power interface, and a second USB interface, where the first USB interface is connected to the second USB interface, and an ID pin of the first USB interface is connected to a low level; the power interface is connected to a power pin of the first USB interface by using the delay conduction circuit and is configured to: after the power interface is powered on, delay power supplied to the first USB interface; the detection circuit is separately connected to the ID pin of the first USB interface and the power interface, and the detection circuit is configured to: when it is detected that the power interface is powered on or powered off, output a high-level pulse to the ID pin of the first USB interface; and the power interface is connected to a power pin of the second USB interface and is configured to supply power to the second USB interface after the power interface is powered on; and when a high-level pulse at an ID pin of the preset USB interface is detected, determining, by the processor in response to the high-level pulse, whether the terminal is in a state of supplying power to the second USB interface; and if yes, stopping supplying power to the second USB interface and receiving, by using the preset USB interface, power supplied from the power interface; or if not, supplying power to the second USB interface.

With reference to the fourth aspect, in a first possible implementation manner, the identifying, by the processor, that an OTG peripheral is inserted into a preset USB interface further includes: if the terminal detects that a power pin of the preset USB interface has electricity, perform the step of stopping supplying power to the second USB interface and receiving, by using the preset USB interface, power supplied from the power interface.

According to a fifth aspect, a power supply system is provided, including: an OTG peripheral and a terminal, where the OTG peripheral includes: a delay conduction circuit, a detection circuit, a first USB interface, a power interface, and a second USB interface, where the first USB interface is connected to the second USB interface, and an ID pin of the first USB interface is connected to a low level; the power interface is connected to a power pin of the first USB interface by using the delay conduction circuit and is configured to: after the power interface is powered on, delay power supplied to the first USB interface; the detection circuit is separately connected to the ID pin of the first USB interface and the power interface, and the detection circuit is configured to: when it is detected that the power interface is powered on or powered off, output a high-level pulse to the ID pin of the first USB interface; and the power interface is connected to a power pin of the second USB interface and is configured to supply power to the second USB interface after the power interface is powered on; and the terminal identifies that the OTG peripheral is inserted into a preset USB interface of the terminal, where the preset USB interface is connected to the first USB interface; and when the terminal detects a high-level pulse at an ID pin of the preset USB interface, the terminal determines, in response to the high-level pulse, whether the terminal is in a state of supplying power to the second USB interface; and if yes, stops supplying power to the second USB interface and receives, by using the preset USB interface, power supplied from the power interface; or if not, supplies power to the second USB interface.

With reference to the fifth aspect, in a first possible implementation manner, the OTG peripheral is the OTG peripheral described in all content of the first aspect, and details are not described herein again.

With reference to the fifth aspect, in a second possible implementation manner, the terminal is the terminal described in all content of the third aspect, and details are not described herein again.

With reference to the fifth aspect, in a third possible implementation manner, the system further includes: a USB secondary device, where the USB secondary device is connected to the OTG peripheral by using the second USB interface of the OTG peripheral.

With reference to the fifth aspect, in a fourth possible implementation manner, the system further includes: a power supply, where the power supply is connected to the OTG peripheral by using the power interface of the OTG peripheral.

By implementing the embodiments of the present disclosure, when a power supply is inserted into an OTG peripheral, the OTG peripheral outputs a high-level pulse to a terminal by using a first USB interface, so as to trigger the terminal to stop supplying power to a USB secondary device, and trigger the powered-on power supply to supply power to the USB secondary device; and in addition, the OTG peripheral waits for a preset safe time and then enables the power supply to supply power to the terminal after the terminal stops supplying power to the USB secondary device. In this way, power is supplied at the same time to a primary device connected to the OTG peripheral and a secondary device connected to the OTG peripheral during OTG communication.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provides a power supply system, an OTG peripheral, a power supply method of a terminal side, and a terminal, to supply power to a primary device connected on the OTG peripheral and a secondary device connected on the OTG peripheral, without interrupting OTG communication between the primary device and the secondary device. Details are separately described below.

Figure 1:
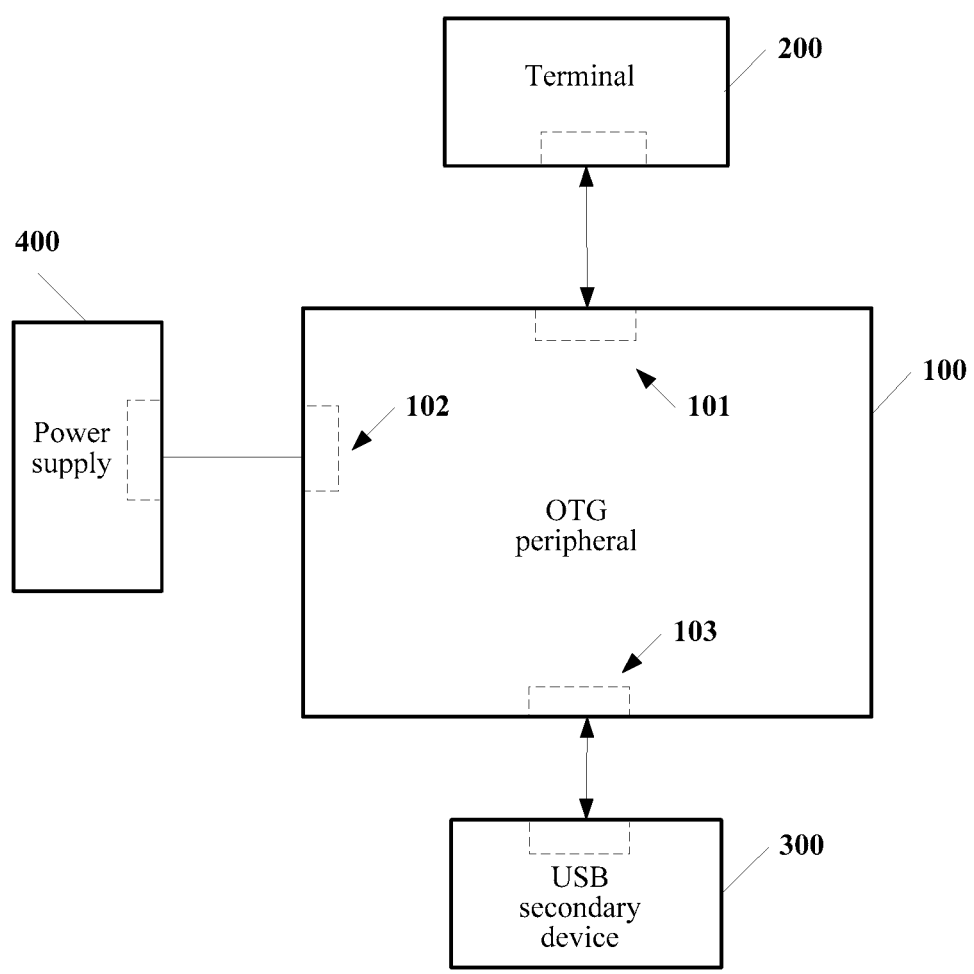
FIG. 1 is a schematic structural diagram of a power supply system according to an embodiment of the present disclosure.

FIG. 1 is a schematic structural diagram of a power supply system according to an embodiment of the present disclosure. Referring to FIG. 1, the power supply system may include: an OTG peripheral 100, a terminal 200, a USB secondary device 300, and a power supply 400. The terminal 200 is connected to the OTG peripheral 100 by using a first USB interface 101, the USB secondary device 300 is connected to the OTG peripheral 100 by using a second USB interface 103, and OTG communication exists between the terminal 200 and the USB secondary device 300.

The power supply 400 is configured to: after the power supply 400 is connected to the OTG peripheral 100, supply power to the terminal 200 and the USB secondary device 300 that are connected to the OTG peripheral 100.

The OTG peripheral 100 is configured to: when the power supply 400 is inserted into the OTG peripheral 100, output a high-level pulse to the terminal 200 by using the first USB interface 101, so as to trigger the terminal 200 to stop supplying power to the USB secondary device 300; and the OTG peripheral 100 is configured to: when the power supply 400 is removed from the OTG peripheral 100, output a high-level pulse to the terminal 200 by using the first USB interface 101, so as to trigger the terminal 200 to supply power to the USB secondary device 300.

In addition, the OTG peripheral 100 is further configured to: after the power supply 400 is inserted into the OTG peripheral 100, wait for a preset safe time, and then enable the power supply 400 to supply power to the terminal 200 after the terminal 200 stops supplying power to the USB secondary device 300.

The terminal 200 is configured to receive the high-level pulse that is output by using the first USB interface 101, and determine, according to the high-level pulse, whether the power supply 400 is inserted into or removed from the OTG peripheral 100. When it is determined that the power supply 400 is inserted into the OTG peripheral 100, the terminal 200 stops supplying power to the USB secondary device 300 and receives power supplied from the power supply 400; and when it is determined that the power supply 400 is removed from the OTG peripheral 100, the terminal 200 supplies power to the USB secondary device 300.

During specific implementation, a working principle of the foregoing power supply system may include:

When the power supply 400 is inserted into the OTG peripheral 100 (when a power interface 102 is powered on), the OTG peripheral 100 rapidly guides a supply voltage to the second USB interface 103, so that the USB secondary device 300 receives power supplied from the power supply 400. In addition, after waiting for the preset safe time, the OTG peripheral 100 guides the supply voltage to the first USB interface 101 to enable the terminal 200 to receive the power supplied from the power supply 400.

When the power supply 400 is inserted into the OTG peripheral 100 (when the power interface 102 is powered on), the OTG peripheral 100 also outputs a high-level pulse by using the first USB interface 101, so as to trigger the terminal 200 to stop supplying power to the USB secondary device 300.

After receiving the high-level pulse that is output by using the first USB interface 101, the terminal 200 determines, according to the high-level pulse, that the power supply 400 is inserted into the OTG peripheral 100 and stops supplying power to the USB secondary device 300.

After stopping supplying power to the USB secondary device 300, the terminal 200 receives the power supplied from the power supply 400. It should be noted that the safe time for which the OTG peripheral 100 waits may be sufficiently long, so that the terminal 200 can implement a process of stopping supplying power to the USB secondary device 300 and receive the power supplied from the power supply 400 safely.

When the power supply 400 is removed from the OTG peripheral 100 (the power interface 102 is powered off), the OTG peripheral 100 outputs a high-level pulse by using the first USB interface 101, so as to trigger the terminal 200 to start supplying power to the USB secondary device 300.

After receiving the high-level pulse that is output by using the first USB interface 101, the terminal 200 determines, according to the high-level pulse, that the power supply 400 is removed from the OTG peripheral 100, and starts supplying power to the USB secondary device 300.

By implementing the power supply system provided in the present disclosure, during OTG communication between the terminal 200 and the USB secondary device 300, it can be implemented that power is supplied to the terminal 200 and the USB secondary device 300 without stopping the OTG communication between the terminal 200 and the USB secondary device 300.

Figure 2:
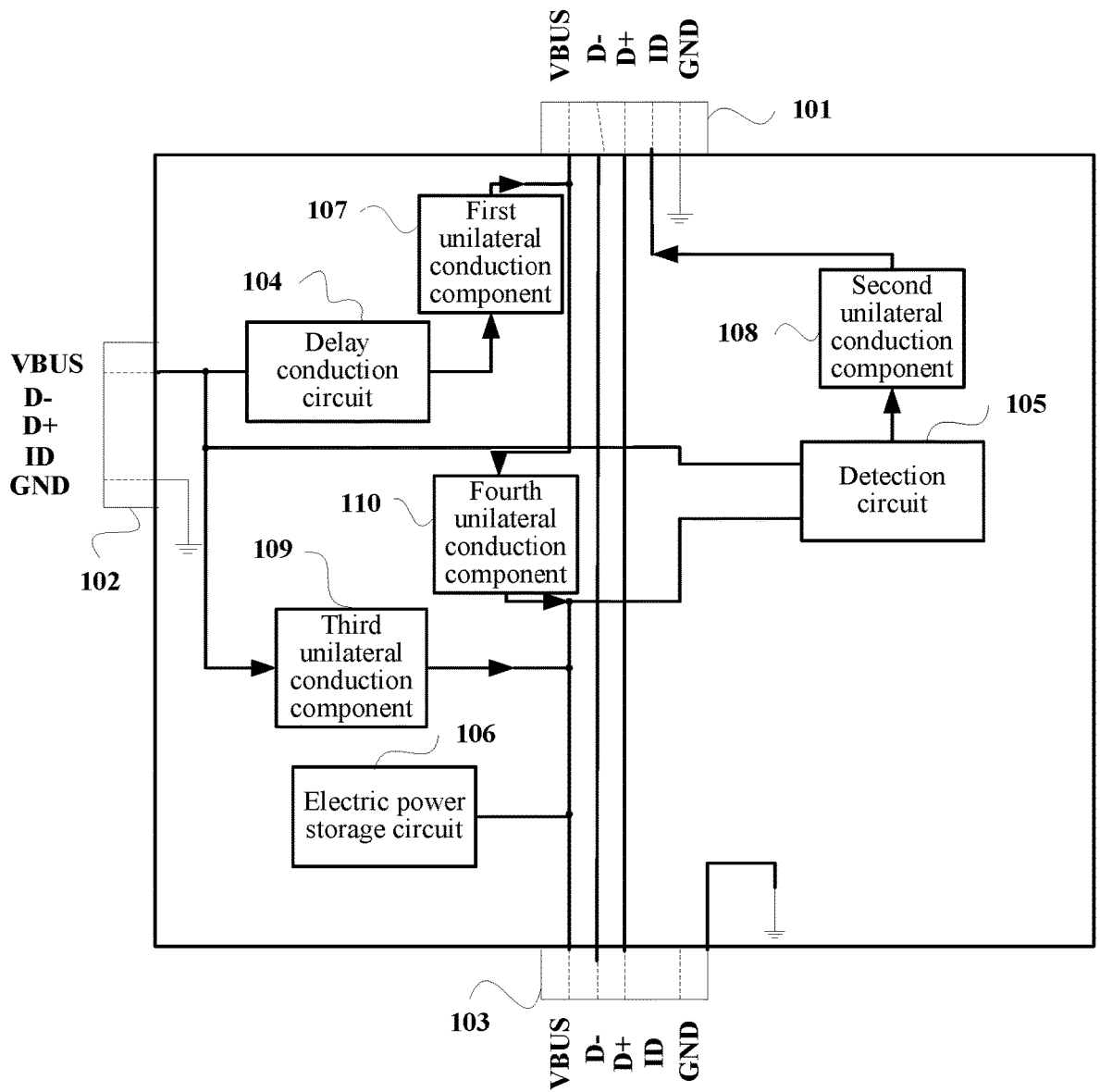
FIG. 2 is a schematic structural diagram of an OTG peripheral according to an embodiment of the present disclosure.

FIG. 2 is a schematic structural diagram of an OTG peripheral according to an embodiment of the present disclosure. Referring to FIG. 2, the OTG peripheral includes: a delay conduction circuit 104, a detection circuit 105, a first USB interface 101, a power interface 102, and a second USB interface 103, where the first USB interface 101 is connected to the second USB interface 103, and an ID pin of the first USB interface 101 is connected to a low level;

the power interface 102 is connected to a power pin of the first USB interface 101 by using the delay conduction circuit 104 and is configured to: after the power interface 102 is powered on, delay power supplied to the first USB interface;

the detection circuit 105 is connected to the ID pin of the first USB interface 101 and the power interface 102 separately, and the detection circuit 105 is configured to: when it is detected that the power interface 102 is powered on, output a high-level pulse to the ID pin of the first USB interface 101, so as to trigger a terminal connected to the first USB interface 101 to stop supplying power to the second USB interface 103; and the power interface 102 is connected to a power pin of the second USB interface 103 and is configured to supply power to the second USB interface 103 after the power interface 102 is powered on.

In this embodiment of the present disclosure, as shown in FIG. 2, the connection between the first USB interface 101 and the second USB interface 103 may include: connections between digital pins (D+ and D−) of the first USB interface 101 and digital pins (D+ and D−) of the second USB interface 103, thereby implementing OTG communication between the terminal connected to the first USB interface 101 and a USB secondary device connected to the second USB interface 103.

In this embodiment of the present disclosure, as shown in FIG. 2, the connection between the first USB interface 101 and the second USB interface 103 may further include: a connection between the power pin of the first USB interface 101 and the power pin of the second USB interface 103, thereby implementing that during the OTG communication between the terminal connected to the first USB interface 101 and the USB secondary device connected to the second USB interface 103, the terminal supplies power to the USB secondary device, that is, the terminal supplies power to a power bus.

The power bus involved in this embodiment refers to a bus that is formed by connecting the power pin of the first USB interface 101 to the power pin of the second USB interface 103, and the bus supplies power to the USB secondary device in the OTG communication.

According to a USB OTG specification, a USB device whose ID pin is grounded always supplies power to the power bus. That is, in this embodiment of the present disclosure, when the power interface 102 is not powered on, the terminal connected to the first USB interface 101 always supplies power to the power bus, that is, the terminal supplies power to the USB secondary device.

In this embodiment of the present disclosure, a power supply status in which the terminal supplies power to the power bus may be further determined in combination with the detection circuit 105: when the power interface 102 is powered on, the detection circuit 105 outputs a high-level pulse to the ID pin of the first USB interface 101 to trigger the terminal to stop supplying power to the power bus; and when the power interface 102 is powered off, the detection circuit 105 outputs a high-level pulse to the ID pin of the first USB interface 101 to trigger the terminal to start supplying power to the power bus.

In this embodiment of the present disclosure, after the power interface 102 is powered on, the delay conduction circuit 104 is in a cut-off state first and then after a preset safe time, the delay conduction circuit 104 is in a conductive state. Herein, the preset safe time is used to ensure that:

before the delay conduction circuit 104 is conductive, the terminal connected to the first USB interface 101 detects the high-level pulse output by the detection circuit 105 and stops supplying power to the power bus.

In a preferred implementation manner, the OTG peripheral shown in FIG. 2 may further include: an electric power storage circuit 106. The electric power storage circuit 106 is connected to the power interface 102, and is configured to: after the power interface 102 is powered on, store power supplied from the power interface 102. The electric power storage circuit 106 is connected to the power pin of the second USB interface 103, and is configured to supply power to the second USB interface 103 after the power interface 102 is powered off.

By using the electric power storage circuit 106, after the power interface 102 is powered off and before the terminal supplies power to the power bus (because a delay may be generated by the terminal connected to the first USB interface 101 and a circuit unit such as the detection circuit 105), the electric power storage circuit 106 supplies, in time, power to the USB secondary device connected to the second USB interface 103, thereby avoiding interruption of OTG communication between the terminal and the USB secondary device.

Further, the OTG peripheral provided in this embodiment of the present disclosure may, as shown in FIG. 2, further include: a first unilateral conduction component 107. The first unilateral conduction component 107 is connected in series between the delay conduction circuit 104 and the power pin of the first USB interface 101, and is configured to cut off a backflow current that flows from the first USB interface 101 to the power interface 102 through the conductive delay conduction circuit 104.

Further, in addition to the first unilateral conduction component 107, the OTG peripheral provided in this embodiment of the present disclosure may, as shown in FIG. 2, further include: a second unilateral conduction component 108. The second unilateral conduction component 108 is connected in series between the detection circuit 105 and the ID pin of the first USB interface 101, and is configured to cut off the high-level pulse output by the detection circuit 105 from flowing to the first USB interface 101.

Further, in addition to the first unilateral conduction component 107 and/or the second unilateral conduction component 108, the OTG peripheral provided in this embodiment of the present disclosure may, as shown in FIG. 2, further include: a third unilateral conduction component 109. The third unilateral conduction component 109 is connected in series between the power pin of the second USB interface 103 and the power interface 102, and is configured to cut off a backflow current that flows from the first USB interface 101 to the power interface 102 (when the first USB interface supplies power to the second USB interface 103).

When the OTG peripheral provided in this embodiment of the present disclosure, as shown in FIG. 2, further includes the electric power storage circuit 106, the third unilateral conduction component 109 may be further configured to cut off a backflow current that flows from the electric power storage circuit 106 to the power interface 102.

Further, in addition to any unilateral conduction component of the first unilateral conduction component 107, the second unilateral conduction component 108, or the third unilateral conduction component 109, the OTG peripheral provided in this embodiment of the present disclosure may, as shown in FIG. 2, further include: a fourth unilateral conduction component 110. The fourth unilateral conduction component 110 is connected in series between the power pin of the first USB interface 101 and the power pin of the second USB interface 103, and is configured to cut off a current that directly flows from the power interface 102 to the first USB interface 101 (without flowing through the delay conduction circuit).

When the OTG peripheral provided in this embodiment of the present disclosure, as shown in FIG. 2, further includes the electric power storage circuit 106, the fourth unilateral conduction component 110 may be further configured to cut off a backflow current that flows from the electric power storage circuit 106 to the power interface 102.

It should be noted that the first unilateral conduction component 107, the second unilateral conduction component 108, the third unilateral conduction component 109, or the fourth unilateral conduction component 110 may use an active diode, or an ultra low voltage drop diode, such as a Schottky diode. In an actual application, this embodiment may also be implemented by using an apparatus having a unilateral-rectification conduction function. It is not limited herein.

In an optional implementation manner, in the OTG peripheral shown in FIG. 2, a power end of the detection circuit 105 may be connected to the power pin of the second USB interface 103. The power pin of the second USB interface 103 may receive power supplied from the power interface 102, or the first USB interface 101, or the electric power storage circuit 106. Therefore, the power pin of the second USB interface 103 may be maintained at a high level, so as to provide a stable power supply to the detection circuit 105.

Similarly, a level of the power pin of the second USB interface 103 is constantly a high level, which may implement providing a stable power supply to the USB secondary device connected to the second USB interface 103 and ensure that OTG communication between the USB secondary device and the terminal is not interrupted.

It should be noted that in this embodiment of the present disclosure, the power interface 102 may be a USB interface not providing a digital pin, or may be a power interface, of another standard, that provides a matching voltage for the first USB interface 101. It is not limited herein. In this embodiment of the present disclosure, the second USB interface 103 may be a USB interface providing an ID pin (the ID pin is unconnected), or may be a USB interface not providing the ID pin.

Figure 3:
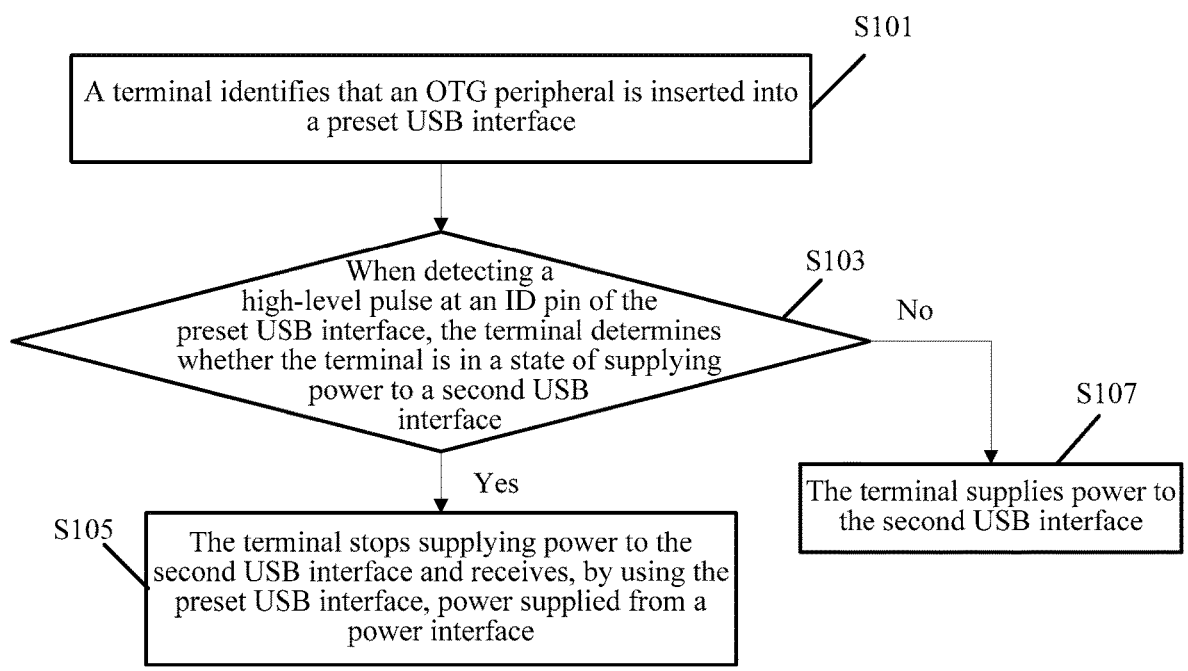
FIG. 3 is a flowchart of a power supply method of a terminal side according to an embodiment of the present disclosure.

FIG. 3 is a flowchart of a power supply method of a terminal side according to an embodiment of the present disclosure. The following explains the power supply method of the terminal side in detail with reference to the power supply system shown in FIG. 1 and the OTG peripheral shown in FIG. 2, and the method includes:

S101: A terminal identifies that an OTG peripheral is inserted into a preset USB interface.

Specifically, the terminal may be the terminal 200 in FIG. 1, and the OTG peripheral may be the OTG peripheral 100 in FIG. 1 or the OTG peripheral 100 in FIG. 2, and details are not described herein again.

Specifically, the preset USB interface is a USB interface, on the terminal, connected to the first USB interface 101 of the OTG peripheral 100.

In this embodiment, the terminal may determine, according to a level of an ID pin of the preset USB interface, whether the OTG peripheral 100 is inserted into the preset USB interface. If the level of the ID pin of the preset USB interface is low, the terminal may determine that the OTG peripheral 100 is inserted into the preset USB interface. It may be understood that, the ID pin of the first USB interface 101 of the OTG peripheral 100 is connected to a low level, and therefore, when the OTG peripheral 100 is connected to the preset USB interface of the terminal by using the first USB interface 101, the ID pin of the preset USB interface is also at a low level.

S103: When detecting a high-level pulse at an ID pin of the preset USB interface, the terminal determines whether the terminal is in a state of supplying power to the second USB interface.

Specifically, when the detection circuit 105 of the OTG peripheral 100 detects that the power interface 102 is powered on or powered off, the detection circuit 105 outputs the high-level pulse to the ID pin of the first USB interface 101. That is, when the detection circuit 105 in the OTG peripheral 100 detects that the power interface 102 is powered on or powered off, the terminal may receive, by using the preset USB interface, the high-level pulse output by the detection circuit 105.

Specifically, if the terminal is in the state of supplying power to the second USB interface by using the preset USB interface, the terminal may determine that the high-level pulse is generated due to insertion of the power supply 400 into the power interface 102 of the OTG peripheral 100; and if the terminal is not in the state of supplying power to the second USB interface by using the preset USB interface, the terminal may determine that the high-level pulse is generated due to removal of the power supply 400 from the power interface 102 of the OTG peripheral 100.

In a specific implementation, the terminal may locally maintain a state in which the power supply 400 is inserted into or removed from the OTG peripheral 100. When the high-level pulse is detected at the preset USB interface, the terminal may reverse the currently maintained state in which the power supply 400 is inserted into or removed from the OTG peripheral 100.

For example, an initial state of the power supply 400 that the terminal locally maintains is: the power supply 400 is removed from the OTG peripheral 100. In this case, when the terminal receives a high-level pulse, the state of the power supply 400 that the terminal locally maintains is reversed to be: the power supply 400 is inserted into the OTG peripheral 100.

Specifically, when a determining result of S103 is yes, the terminal may perform S105; or when a determining result of S103 is not, the terminal may perform S107.

S105: The terminal stops supplying power to the second USB interface and receives, by using the preset USB interface, power supplied from the power interface of the OTG peripheral.

Specifically, when it is determined that the high-level pulse is generated due to insertion of the power supply 400 into the power interface 102 of the OTG peripheral 100, the terminal may immediately stop outputting a voltage to the second USB interface by using the preset USB interface. After a preset safe time (the preset safe time is controlled by the delay conduction circuit 104 of the OTG peripheral 100), the terminal receives, by using a power pin of the preset interface, the power supplied from the power interface 102.

S107: The terminal supplies power to the second USB interface.

Specifically, when it is determined that the high-level pulse is generated due to removal of the power supply 400 from the power interface 102 of the OTG peripheral 100, the terminal may immediately output a voltage to the second USB interface by using the preset USB interface, so as to supply power to a USB secondary device connected to the second USB interface 103 of the OTG peripheral 100, thereby avoiding interruption of OTG communication between the USB secondary device and the terminal.

Herein, the electric power storage circuit 106 in the OTG peripheral 100 shown in FIG. 2 may implement: after the power supply 400 is removed from the OTG peripheral 100 and before the terminal supplies power to the second USB interface, the electric power storage circuit 106 supplies power to the USB secondary device connected to the second USB interface 103 of the OTG peripheral 100, thereby avoiding interruption of the OTG communication between the USB secondary device and the terminal.

In this embodiment of the present disclosure, when performing S101, the terminal may also detect whether the power pin of the preset USB interface has electricity, and if the power pin of the preset USB interface has electricity, perform S105.

It should be understood that when the OTG peripheral 100 is inserted into the preset USB interface, if the power pin of the preset USB interface already has electricity, and the level of the ID pin of the preset USB interface is low, the terminal may determine that: before the OTG peripheral 100 is inserted into the preset USB interface of the terminal, the power supply 400 has already inserted into the power interface 102 of the OTG peripheral 100. In this case, the terminal does not need to supply power to the second USB interface, and may directly receive, by using the preset USB interface, the power supplied from the power interface 102.

By implementing this embodiment of the present disclosure, a terminal determines, according to a high-level pulse output by an OTG peripheral, whether a power supply is inserted into the OTG peripheral; if the power supply is inserted into the OTG peripheral, the terminal stops supplying power to a USB secondary device connected to the OTG peripheral, and after a preset safe time, receives power supplied from the power supply; and if the power supply is removed from the OTG peripheral, the terminal starts supplying power to the USB secondary device connected to the OTG peripheral. It can be implemented that power is supplied to a primary device connected to the OTG peripheral and a secondary device connected to the OTG peripheral, without interrupting OTG communication between the primary device and the secondary device.

Figure 4:
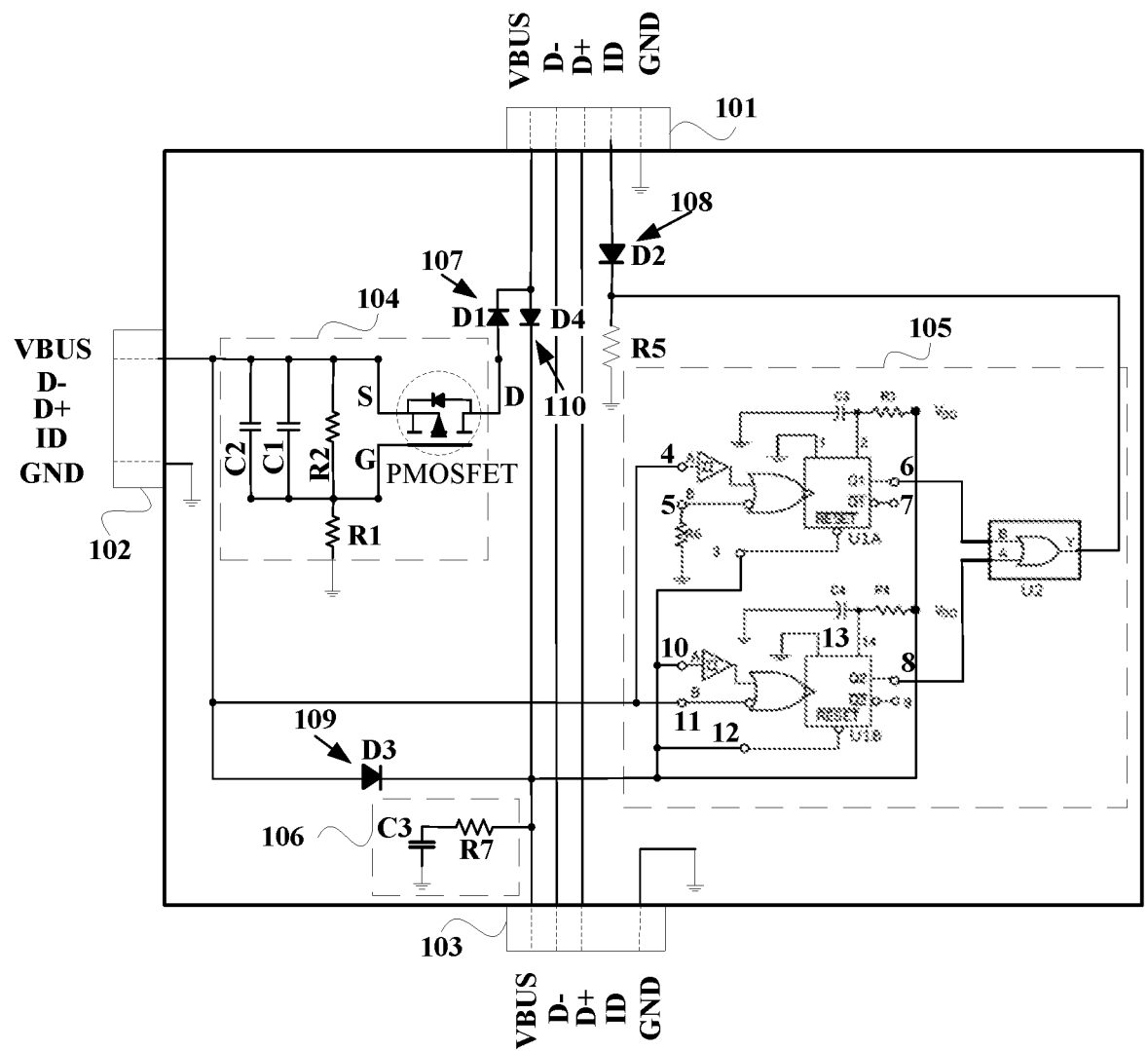
FIG. 4 is a circuit structural diagram of an OTG peripheral according to an embodiment of the present disclosure.

FIG. 4 further shows a circuit structural diagram of an OTG peripheral according to an embodiment of the present disclosure. The embodiment of FIG. 4 is an implementation manner of the embodiment of FIG. 2, and for content that is not mentioned in the embodiment of FIG. 4, refer to the description of the embodiment of FIG. 2. As shown in FIG. 4, a switch circuit in the delay conduction circuit 104 is a P-MOS transistor switch circuit. The following describes a basic structure of each circuit unit in the OTG peripheral in detail with reference to FIG. 4.

According to the embodiment of FIG. 4, the delay conduction circuit 104 within a dashed rectangle may include: a switch circuit (a P-MOS transistor (PMOSFET) within a dashed circle) and a delay circuit (a first capacitor C1, a first resistor R1, and a second resistor R2).

The delay circuit controls a conduction time of the switch circuit, that is, the preset safe time. When the switch circuit is on, a circuit between the power interface 102 and the power pin of the first USB interface 101 is a closed circuit. When the switch circuit is cut off, the circuit between the power interface 102 and the power pin of the first USB interface 101 is an open circuit.

In the delay conduction circuit 104 shown in FIG. 4: the first capacitor C1 and the first resistor R1 are connected in series; the first capacitor C1 is connected in parallel between a gate (G electrode) and a source (S electrode) of the P-MOS transistor; the gate of the P-MOS transistor is grounded by using the first resistor R1, the source of the P-MOS transistor is connected to the power interface 102, and a drain (D electrode) of the P-MOS transistor is connected to the power pin (VBUS pin) of the first USB interface 101; the second resistor R2 is also connected in parallel between the gate and the source of the P-MOS transistor, and the second resistor R2 is configured to adjust a voltage between the gate and the source of the P-MOS transistor.

It may be understood that the first capacitor C1 and the first resistor R1 determine a delay time for delayed conduction of the P-MOS transistor in FIG. 2. In a specific implementation, if the delay time is set to be the preset safe time, a value of the first resistor R1 and a value of the first capacitor C1 may be selected according to a formula used for calculating a delay time of an RC delay circuit: $T=-R*C*\ln[(U-Uc)/U]$, where R is the first resistor R1, C is the first capacitor C1, U is an output voltage of the power interface 102, and Uc is a voltage difference between two ends of the first capacitor C1.

It may be understood that the first resistor R1 and the second resistor R2 determine a voltage that finally falls between the gate and the source of the P-MOS transistor, that is, after the power interface 102 is powered on and after the preset safe time, finally, a gate voltage of the P-MOS transistor is a divided voltage of the first resistor R1. Herein, according to a conduction condition of the P-MOS transistor: $Ug-Us<0$ and $|Ug-Us|>|Ugs(th)|$, it can be known that after the preset safe time, the P-MOS transistor may be finally in a stable conductive state, where Ugs(th) is a turn-on voltage of the P-MOS transistor, Ug is a gate voltage of the P-MOS transistor, and Us is a source voltage of the P-MOS transistor.

Preferably, the delay conduction circuit 104 may further include a second capacitor C2. The second capacitor C2 is connected in parallel between the gate and the source of the P-MOS transistor. A capacitance of the second capacitor C2 is less than that of the first capacitor C1, and in an actual application, a nanofarad-level (nF) capacitor may be used, which is configured to: when the power interface 102 is powered on, rapidly increase the gate voltage of the P-MOS transistor to the supply voltage of the P-MOS transistor, so that the P-MOS transistor is in a cut-off state, thereby avoiding false conduction of the P-MOS transistor.

It should be noted that: the switch circuit involved in this embodiment of the present disclosure may include: a triode switch circuit, a field effect transistor switch circuit, or another circuit unit that can simulate a switch function, which is not limited herein. The delay circuit involved in this embodiment of the present disclosure may include: an RC delay circuit, a timer delay circuit, and another circuit unit having a delay function, which is not limited herein.

According to the embodiment of FIG. 4, the detection circuit 105 within the dashed rectangle may include a double monostable trigger circuit U1. The double monostable trigger circuit U1 includes: a first monostable trigger circuit U1A and a second monostable trigger circuit U1B.

A table of functions of the first monostable trigger circuit U1A according to the embodiment of FIG. 4 is shown in Table 1:

TABLE 1

| Input end | | | Output end |
|---|---|---|---|
| Pin 4 (A) | Pin 5 (B) | Pin 3 | Pin 6 (Q1) |
| ↓ | L | H | ⊓ |
| H | ↑ | H | ⊓ |
| X | X | L | L |

A table of functions of the second monostable trigger circuit U1B according to the embodiment of FIG. 4 is shown in Table 2:

TABLE 2

| Input end | | | Output end |
|---|---|---|---|
| Pin 10 (A) | Pin 11 (B) | Pin 12 | Pin 8 (Q2) |
| ↓ | L | H | ⊓ |
| H | ↑ | H | ⊓ |
| X | X | L | L |

In the foregoing Table 1 and Table 2, "H" represents a high level, "L" represents a low level, "X" represents that it does not need to be considered, "↑" represents a positive-going transition (positive-going transition) of an input signal, "↓" represents a negative-going transition (negative-going transition) of the input signal, and "⊓" represents a high-level output pulse (HIGH level output pulse). The pin 3 and the pin 12 are both reset pins, and the high level is effective.

According to the embodiment corresponding to FIG. 4, a negative-going transition triggered input end 4 (input: High to Low triggered) of the first monostable trigger circuit U1A of the double monostable trigger circuit U1 is connected to the power interface 102, and a positive-going transition triggered input end 5 (input: Low to High triggered) of the first monostable trigger circuit U1A is connected to a low level (or is grounded). In addition, an external capacitor C3 and resistor R3 may be configured to control a width of a pulse output by an output end Q1.

According to the embodiment corresponding to FIG. 4, a negative-going transition triggered input end 10 of the second monostable trigger circuit U1B of the double monostable trigger circuit U1 is connected to the power pin of the second USB interface 103; and a positive-going transition triggered input end 11 of the second monostable trigger circuit U1B of the double monostable trigger circuit U1 is connected to the power interface 102. Herein, according to the content described in the embodiment corresponding to FIG. 2, the level of the power pin of the second USB interface 103 is constantly a high level, that is, the negative-going transition triggered input end 10 is constantly at a high level. In addition, an external capacitor C4 and resistor R4 may be configured to control a width of a pulse output by an output end Q2.

According to the embodiment of FIG. 4, the detection circuit 105 further includes an OR gate circuit U2. An output end 6 of the first monostable trigger circuit U1A and an output end 8 of the second monostable trigger circuit U1B output a signal through the OR gate circuit U2, and an output end of the OR gate circuit U2 is connected to the ID pin of the first USB interface 101.

Therefore, the detection circuit provided in the embodiment of FIG. 4 may implement outputting high-level pulse signals through the OR gate circuit U2 at both a positive-going transition and a negative-going transition of a signal of the power interface 102. That is, when the power interface 102 is powered on (a positive-going transition of an input signal is generated), or when the power interface 102 is powered off (a negative-going transition of an input signal is generated), the OR gate circuit U2 outputs a high-level pulse to the ID pin of the first USB interface 101, so as to trigger a device connected to the first USB interface 101 to stop or start supplying power to the external.

According to the embodiment of FIG. 4, the electric power storage circuit 106 within the dashed rectangle may include: a fifth resistor R7 and a fourth capacitor C3 that are connected in series, where the fifth resistor R7 is connected to the power pin of the second USB interface 103, and the fourth capacitor C3 is grounded. When the power interface 102 is powered on, the fourth capacitor C3 starts storing electricity. When the power interface 102 is powered off, the fourth capacitor C3 starts discharging the stored electricity to the external by using the fifth resistor R7. The electric power storage circuit 106 may implement that: when an external power supply is removed from the power interface 102, power is supplied by using the electric power storage circuit 106 to a device connected to the second USB interface, thereby avoiding interruption of OTG communication caused by power-off of the device connected to the second USB interface.

In addition, as shown in FIG. 4, the ID pin of the first USB interface 101 may be grounded by using a resistor R5. The first unilateral conduction component 107, the second unilateral conduction component 108, the third unilateral conduction component 109, or the fourth unilateral conduction component 110 may use a diode to implement a unilateral-rectification conduction function.

Figure 5:
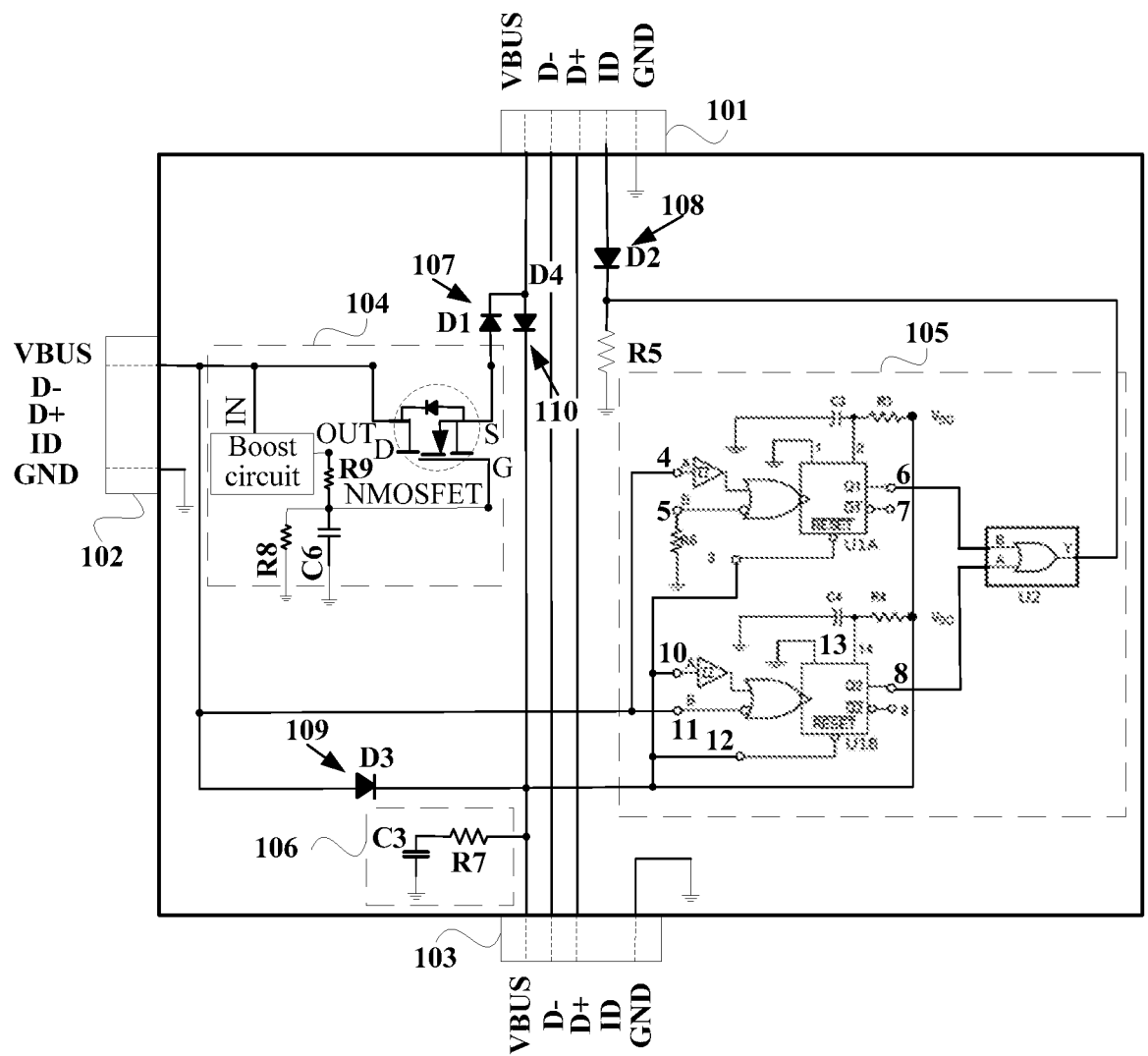
FIG. 5 is another circuit structural diagram of an OTG peripheral according to an embodiment of the present disclosure.

FIG. 5 further shows another circuit structural diagram of an OTG peripheral according to an embodiment of the present disclosure. The embodiment of FIG. 5 is another implementation manner of the embodiment of FIG. 2, and for content that is not mentioned in the embodiment of FIG. 5, refer to the description of the embodiment of FIG. 2 or FIG. 4. As shown in FIG. 5, the switch circuit in the delay conduction circuit 104 is an N-MOS transistor switch circuit. The following describes a basic structure of each circuit unit in the OTG peripheral in detail with reference to FIG. 5.

As shown in FIG. 5, the delay conduction circuit 104 within a dashed rectangle may include: a switch circuit (an N-MOS transistor (NMOSFET) within a dashed circle) and a delay circuit (a boost circuit, a third resistor R9, a third capacitor C6, and a fourth resistor R8).

The delay circuit controls a conduction time of the switch circuit, that is, the preset safe time. When the switch circuit is on, a circuit between the power interface 102 and the power pin of the first USB interface 101 is a closed circuit. When the switch circuit is cut off, the circuit between the power interface 102 and the power pin of the first USB interface 101 is an open circuit.

In the delay conduction circuit 104 shown in FIG. 5: the third capacitor C6 and the third resistor R9 are connected in series; a source (S electrode) of the N-MOS transistor is connected to the power pin of the first USB interface 101, a drain (D electrode) of the N-MOS transistor is connected to the power interface 102, and a gate (G electrode) of the N-MOS transistor is grounded by using the third capacitor C6; a power input end (IN) of the boost circuit is connected to the power interface 102, and a power output end (OUT) of the boost circuit is connected to the gate of the N-MOS transistor by using the third resistor R9 and is configured to increase a gate voltage of the N-MOS transistor; and the fourth resistor R8 is connected in parallel to the third capacitor C6 and is configured to adjust, together with the third resistor R9, the gate voltage that finally falls on the N-MOS transistor.

It may be understood that to make the N-MOS transistor be in a conductive state, the gate voltage of the N-MOS transistor needs to be higher than a source voltage. According to a conduction condition of the N-MOS transistor: Ug−Us>0 and |Ug−Us|>|Ugs(th)|, it can be known that a voltage (Ug) that is finally divided onto two ends of the fourth resistor R8 from an output voltage of the boost circuit needs to be greater than the source voltage (Us) of the N-MOS transistor, and a difference between the voltage (Ug) and the voltage (Us) needs to be greater than a turn-on voltage (Ugs(th)) of the N-MOS transistor. It should be noted that in an actual application, the gate voltage of the N-MOS transistor may also be obtained from another high-level node as long as the conduction condition of the N-MOS transistor is satisfied.

It may be understood that the third capacitor C6 and the third resistor R9 determine a delay time for delayed conduction of the N-MOS transistor in FIG. 3. In a specific implementation, if the delay time is set to be the preset safe time, a value of the third resistor C6 and a value of the third capacitor R9 may be selected according to a formula used for calculating a delay time of an RC delay circuit: T=−R*C*ln [(U−Uc)/U], where R is the third resistor R9, C is the third capacitor C6, U is an output voltage of the the boost circuit, and Uc is a voltage difference between two ends of the first capacitor C6.

For other circuit units such as the detection circuit 105 and the electric power storage circuit 106 in the OTG peripheral shown in FIG. 5, refer to the content described in the embodiment of FIG. 4, and details are not described herein again.

Figure 6:
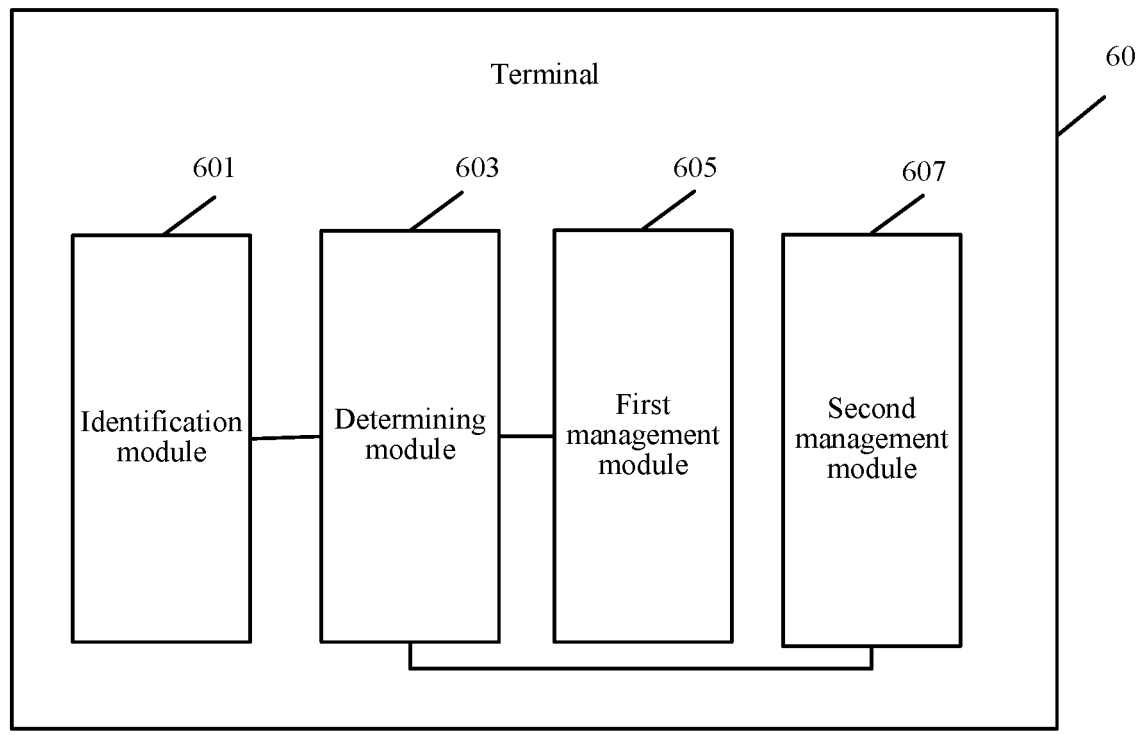
FIG. 6 is a schematic structural diagram of a first embodiment of a terminal according to an embodiment of the present disclosure.

FIG. 6 is a schematic structural diagram of a first embodiment of a terminal according to an embodiment of the present disclosure. The terminal 60 shown in FIG. 6 may include: an identification module 601, a determining module 603, a first management module 605, and a second management module 607. The terminal 60 may be configured to perform the method according to the embodiment of FIG. 3. For content that is not mentioned in the embodiment shown in FIG. 6, refer to the description in the embodiments corresponding to FIG. 1 to FIG. 3 respectively.

The identification module 601 is configured to identify that an OTG peripheral is inserted into a preset USB interface.

The determining module 603 is configured to: when the terminal detects a high-level pulse at an ID pin of the preset USB interface, determine in response to the high-level pulse, whether the terminal is in a state of supplying power to the second USB interface.

The first management module 605 is configured to: when a determining result output by the determining module 603 is yes, stop supplying power to the second USB interface and receive, by using the preset USB interface, power supplied from the power interface.

The second management module 607 is configured to: when the determining result output by the determining module 603 is not, supply power to the second USB interface.

Specifically, the OTG peripheral may be the OTG peripheral 100 shown in FIG. 2, and details are not described herein again.

Figure 7:
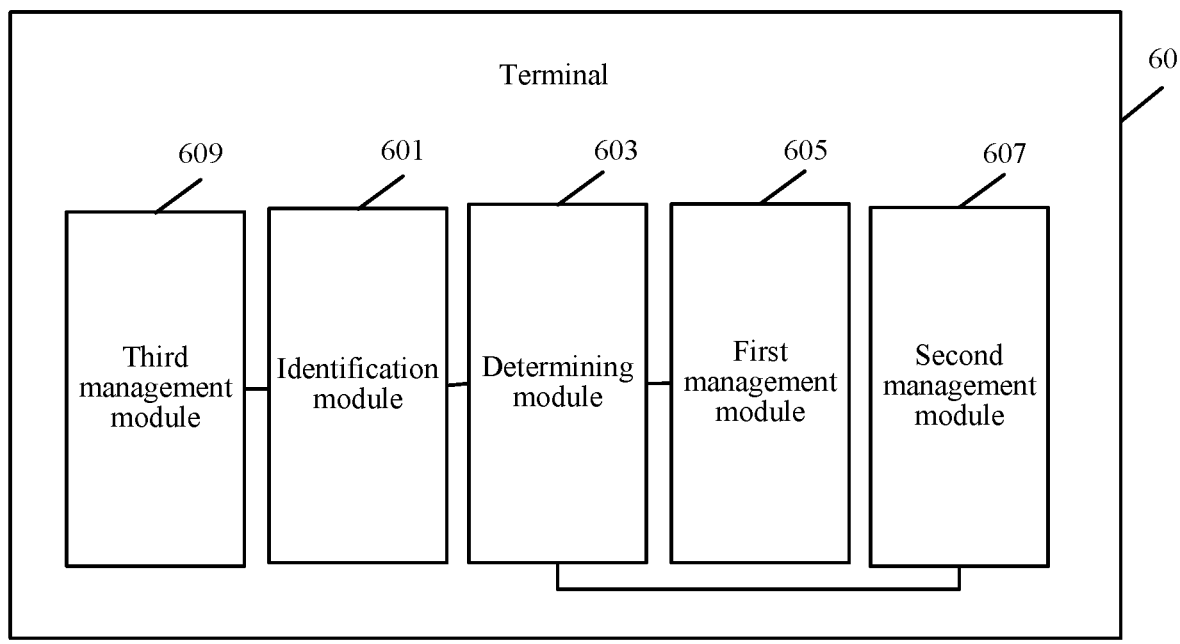
FIG. 7 is a schematic structural diagram of a second embodiment of a terminal according to an embodiment of the present disclosure.

Further, as shown in FIG. 7, in addition to the identification module 601, the determining module 603, the first management module 605, and the second management module 607, the terminal 60 may further include: a third management module 609, configured to: when the identification module 601 identifies that the OTG peripheral is inserted into the preset USB interface on the terminal, if the terminal detects that a power pin of the preset USB interface has electricity, perform the step of stopping supplying power to the second USB interface and receiving, by using the preset USB interface, power supplied from the power interface.

It may be understood that functions of the functional modules in the terminal 60 may be specifically implemented according to the method in the embodiment of FIG. 3, and details are not described herein again.

Figure 8:
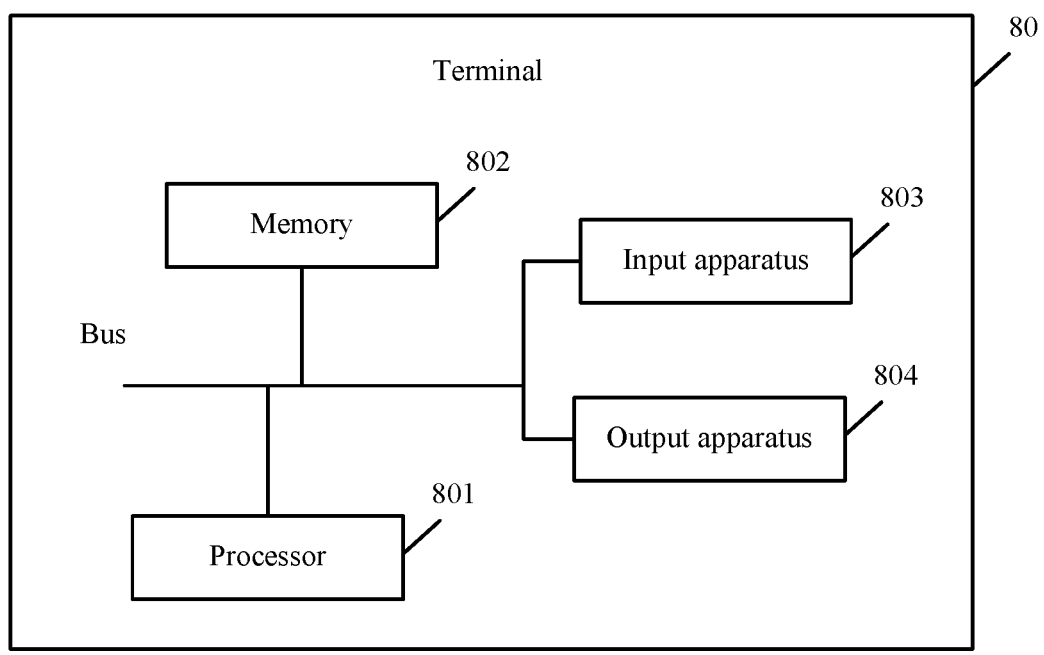
FIG. 8 is a schematic structural diagram of a third embodiment of a terminal according to an embodiment of the present disclosure.

FIG. 8 is a schematic structural diagram of a third embodiment of a terminal according to an embodiment of the present disclosure. Referring to FIG. 8, the terminal 80 may include: an input apparatus 803, an output apparatus 804, a memory 802, and a processor 801 coupled to the memory 802 (there may be one or more processors 801 in the terminal 80, and in FIG. 8, one processor is used as an example). In some embodiments of the present disclosure, the input apparatus 803, the output apparatus 804, the memory 802, and the processor 801 may be connected by using a bus or in another manner. In FIG. 8, an example in which connection is implemented by using a bus is used.

The memory 802 is configured to store program code, and the processor 801 is configured to invoke the program code stored in the memory and perform the following steps:

identifying that an OTG peripheral is inserted into a preset USB interface; and when a high-level pulse at an ID pin of the preset USB interface is detected, determining, by the processor in response to the high-level pulse, whether the terminal is in a state of supplying power to the second USB interface; and if yes, stopping supplying power to the second USB interface and receiving, by using the preset USB interface, power supplied from the power interface; or if not, supplying power to the second USB interface.

Specifically, the input apparatus 803 may be the preset USB interface, and the output apparatus 804 may also be the preset USB interface.

In this embodiment of the present disclosure, the OTG peripheral may be the OTG peripheral 100 shown in FIG. 2, and details are not described herein again.

In this embodiment of the present disclosure, when it is identified that the OTG peripheral is inserted into the preset USB interface, if the terminal detects that a power pin of the preset USB interface has electricity, the processor 801 performs the step of stopping supplying power to the second USB interface and receiving, by using the preset USB interface, power supplied from the power interface.

It may be understood that functions of the functional modules in the terminal 80 may be specifically implemented according to the method in the embodiment of FIG. 3, and details are not described herein again.

To sum up, in the power supply system shown in FIG. 1, when the power supply 400 is inserted into the OTG peripheral 400, the OTG peripheral 400 outputs a high-level pulse to the terminal 200 by using the first USB interface 101, so as to trigger the terminal 200 to stop supplying power to the USB secondary device 300; and in addition, the OTG peripheral waits for a preset safe time and then enables the power supply 400 to supply power to the terminal 200 after the terminal 200 stops supplying power to the USB secondary device 300; and when the power supply 400 is removed from the OTG peripheral 100, the OTG peripheral 100 outputs a high-level pulse to the terminal 200 by using the first USB interface 101, so as to trigger the terminal 200 to supply power to the USB secondary device 300. It can be implemented that power is supplied to the terminal 200 and the USB secondary device 300 that are connected to the OTG peripheral 100, without interrupting OTG communication between the terminal 200 and the USB secondary device 300.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

What are disclosed above are merely example embodiments of the present disclosure, and certainly are not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. An OTG peripheral, comprising: a delay conduction circuit, a detection circuit, a first USB interface, a power interface, and a second USB interface, wherein the first USB interface is connected with the second USB interface, and an ID pin of the first USB interface is connected with the detection circuit;

the power interface is connected with a power pin of the first USB interface through the delay conduction circuit and is configured to: delay power supplied to the first USB interface after the power interface is powered on;

the detection circuit is configured to: output a high-level pulse to the ID pin of the first USB interface when it is detected that the power interface is powered on to cause a terminal connected to the first USB interface to stop supplying power to the second USB interface; and the power interface is connected to a power pin of the second USB interface and is configured to supply power to the second USB interface after the power interface is powered on; and, wherein the OTG peripheral further comprises a unidirectional conduction component comprising a diode, wherein the unidirectional conduction component is connected in series between the detection circuit and the ID pin of the first USB interface, and the unidirectional conduction component is configured to cut off the high-level pulse output by the detection circuit from flowing to the first USB interface.

2. The peripheral according to claim 1, wherein the detection circuit is further configured to: output a high-level pulse to the ID pin of the first USB interface when it is detected that the power interface is powered off to cause the terminal to supply power to the second USB interface.

3. The peripheral according to claim 1, wherein the peripheral further comprises: an electric power storage circuit, wherein the electric power storage circuit is connected to the power interface and is connected to the power pin of the second USB interface, and is configured to: store power supplied from the power interface after the power interface is powered on, and supply power to the second USB interface after the power interface is powered off.

4. The peripheral according claim 3, wherein a power end of the detection circuit is connected to the power pin of the second USB interface, and is configured to receive power supplied from the power interface, or the first USB interface, or the electric power storage circuit.

5. The peripheral according to claim 3, wherein the electric power storage circuit comprises: a fifth resistor and a fourth capacitor that are connected in series, wherein the fifth resistor is connected to the power pin of the second USB interface, and the fourth capacitor is grounded.

6. The peripheral according claim 1, wherein a power end of the detection circuit is connected to the power pin of the second USB interface, and is configured to receive power supplied from the power interface or the first USB interface.

7. The peripheral according to claim 1, wherein the delay conduction circuit comprises: a switch circuit and a delay circuit, wherein
the delay circuit is configured to facilitating a controlling of the switch circuit such that when the switch circuit is switched on, a circuit between the power interface and the power pin of the first USB interface is closed; and when the switch circuit is switched off, a circuit between the power interface and the power pin of the first USB interface is open.

8. The peripheral according to claim 7, wherein the delay conduction circuit further comprises a second resistor; the switch circuit is a P-MOS transistor switch circuit; and the delay conduction circuit comprises: a first capacitor and a first resistor that are connected in series, wherein
the first capacitor is connected in parallel between a gate and a source of the MOS transistor, the gate of the MOS transistor is grounded by using the first resistor, the source of the MOS transistor is connected to the power interface, and a drain of the MOS transistor is connected to the power pin of the first USB interface; and
the second resistor is also connected in parallel between the gate and the source of the MOS transistor, and the second resistor is configured to adjust a voltage between the gate and the source of the MOS transistor.

9. The peripheral according to claim 8, wherein the delay conduction circuit further comprises a second capacitor, wherein the second capacitor is also connected in parallel between the gate and the source of the P-MOS transistor; and a capacitance of the second capacitor is less than that of the first capacitor, and the second capacitor is configured to: when the power interface is powered on, increase a gate voltage of the P-MOS transistor to a supply voltage of the power interface, so that the P-MOS transistor is in a cut-off state.

10. The peripheral according to claim 7, wherein the delay conduction circuit further comprises: a boost circuit and a fourth resistor; the switch circuit is an N-MOS transistor switch circuit; and the delay conduction circuit comprises: a third resistor and a third capacitor that are connected in series; a source of the N-MOS transistor is connected to the power pin of the first USB interface, a drain of the N-MOS transistor is connected to the power interface, and a gate of the N-MOS transistor is grounded by using the third capacitor; a power input end of the boost circuit is connected to the power interface, and a power output end of the boost circuit is connected to the gate of the N-MOS transistor by using the third resistor and is configured to increase a gate voltage of the N-MOS transistor; and the fourth resistor is connected in parallel to the third capacitor and is configured to adjust the gate voltage of the N-MOS transistor.

11. The peripheral according to claim 1, wherein the detection circuit comprises: a double monostable trigger circuit, wherein a negative-going transition triggered input end of a first monostable trigger circuit of the double monostable trigger circuit is connected to the power interface, and a positive-going transition triggered input end of the first monostable trigger circuit is connected to a low level;
a negative-going transition triggered input end of a second monostable trigger circuit of the double monostable trigger circuit is connected to the power pin of the second USB interface;
a positive-going transition triggered input end of the second monostable trigger circuit of the double monostable trigger circuit is connected to the power interface;
an output end of the first monostable trigger circuit and an output end of the second monostable trigger circuit output a signal through an OR gate circuit, and an output end of the OR gate circuit is connected to the ID pin of the first USB interface; and
the double monostable trigger circuit is configured to output high-level pulse signals through the OR gate circuit at both a positive-going transition and a negative-going transition of a signal of the power interface.

12. The peripheral according to claim 1, wherein the unidirectional conduction component is a second unidirectional conduction component comprising a second diode, and the peripheral further comprises: a first unidirectional conduction component comprising a first diode, wherein the first unidirectional conduction component is connected in series between the delay conduction circuit and the power pin of the first USB interface, and the first unidirectional conduction component is configured to cut off a backflow current that flows from the first USB interface to the power interface through the conductive delay conduction circuit.

13. The peripheral according to claim 1, wherein the unidirectional conduction component is a second unidirectional conduction component comprising a second diode, and the peripheral further comprises: a third unidirectional conduction component comprising a third diode, wherein the third unidirectional conduction component is connected in series between the power pin of the second USB interface and the power interface, and the third unidirectional conduction component is configured to cut off a backflow current that flows from the first USB interface to the power interface.

14. The peripheral according to claim 1, wherein the unidirectional conduction component is a second unidirectional conduction component comprising a second diode, and the peripheral further comprises: a fourth unidirectional conduction component comprising a fourth diode, wherein the fourth unidirectional conduction component is connected in series between the power pin of the first USB interface and the power pin of the second USB interface, and the fourth unidirectional conduction component is configured to cut off a current that flows from the power interface to the first USB interface.

15. A power supply method, comprising:
identifying, by a terminal, that an OTG peripheral is inserted into a preset USB interface on the terminal, wherein the OTG peripheral comprises: a delay conduction circuit, a detection circuit, a first USB interface, a power interface, and a second USB interface, wherein
the first USB interface is connected with the second USB interface, and an ID pin of the first USB interface is connected with the detection circuit;

the power interface is connected with a power pin of the first USB interface through the delay conduction circuit and is configured to: after the power interface is powered on, delay power supplied to the first USB interface;

the detection circuit is configured to: when it is detected that the power interface is powered on or powered off, output a high-level pulse to the ID pin of the first USB interface;

the power interface is connected to a power pin of the second USB interface and is configured to supply power to the second USB interface after the power interface is powered on, wherein the OTG peripheral further comprises a unidirectional conduction component, wherein the unidirectional conduction component is connected in series between the detection circuit and the ID pin of the first USB interface, and the unidirectional conduction component is configured to cut off the high-level pulse output by the detection circuit from flowing to the first USB interface; and, wherein the method comprises when the terminal detects a high-level pulse at an ID pin of the preset USB interface, determining, by the terminal in response to the high-level pulse, whether the terminal is in a state of supplying power to the second USB interface;

if it is determined that the terminal is in the state of supplying power to the second USB interface, stopping supplying power to the second USB interface and receiving, by using the preset USB interface, power supplied from the power interface; and if it is determined that the terminal is not in the state of supplying power to the second USB interface, supplying power to the second USB interface.

16. The method according to claim 15, wherein identifying, by the terminal, that the OTG peripheral is inserted into the preset USB interface on the terminal further comprises: if the terminal detects that a power pin of the preset USB interface has electricity, performing the step of stopping supplying power to the second USB interface and receiving, by using the preset USB interface, power supplied from the power interface.

17. A terminal, comprising: an input apparatus, an output apparatus, a memory, and a processor coupled to the memory, wherein the processor reads an instruction stored in the memory to perform:
identifying that an OTG peripheral is inserted into a preset USB interface, wherein the OTG peripheral comprises:
a delay conduction circuit, a detection circuit, a first USB interface, a power interface, and a second USB interface, wherein the first USB interface is connected with the second USB interface, and an ID pin of the first USB interface is connected with the detection circuit;

the power interface is connected with a power pin of the first USB interface through the delay conduction circuit and is configured to: after the power interface is powered on, delay power supplied to the first USB interface;

the detection circuit is configured to: when it is detected that the power interface is powered on or powered off, output a high-level pulse to the ID pin of the first USB interface;

the power interface is connected to a power pin of the second USB interface and is configured to supply power to the second USB interface after the power interface is powered on wherein the OTG peripheral further comprises a unidirectional conduction component, wherein the unidirectional conduction component is connected in series between the detection circuit and the ID pin of the first USB interface, and the unidirectional conduction component is configured to cut off the high-level pulse output by the detection circuit from flowing to the first USB interface; and, wherein the method comprises:

when a high-level pulse at an ID pin of the preset USB interface is detected, determining in response to the high-level pulse, whether the terminal is in a state of supplying power to the second USB interface;

if it is determined that the terminal is in the state of supplying power to the second USB interface, stopping supplying power to the second USB interface and receiving, by using the preset USB interface, power supplied from the power interface; and if it is determined that the terminal is not in the state of supplying power to the second USB interface, supplying power to the second USB interface.

18. The terminal according to claim 17, wherein the processor is further configured to:
when it is identified that the OTG peripheral is inserted into the preset USB interface, if the terminal detects that a power pin of the preset USB interface has electricity, perform the step of stopping supplying power to the second USB interface and receiving, by using the preset USB interface, power supplied from the power interface.

* * * * *